UNITED STATES PATENT OFFICE.

ELIAS LEAK, HENRY MOORE, AND JAMES TAYLOR, OF TRENTON, N. J.

IMPROVEMENT IN HEATED METALLIC MOLDS FOR FORMING CROCKERY-WARE.

Specification forming part of Letters Patent No. 127,074, dated May 21, 1872.

*To all whom it may concern:*

Be it known that we, ELIAS LEAK, HENRY MOORE, and JAMES TAYLOR, of Trenton, in the county of Mercer and State of New Jersey, have invented a new Process of Manufacturing Crockery-Ware from Heated Metallic Molds; and we do hereby declare that the following is a full, clear, and exact description of the same.

The molds are made of any suitable metal, of the size, style, and description required, and when desired to be used they are heated, either by fire or steam, to about the temperature of 212° Fahrenheit; then they are operated in the same manner as other molds.

The superior advantages derived from the use of heated metallic molds are that the ware when molded presents a more solid, smooth, and polished surface than can be obtained by the use of any made from plaster of Paris, are applicable alike to all colors and kinds of soft or plastic clay, and will deliver the molded ware immediately without the least difficulty. By this process several pieces of ware can be made before the mold requires to be reheated; whereas molds made of plaster of Paris, after being filled, must be laid aside for several hours before the cast or molded ware can be taken out, thus causing much loss of time. But metal molds, after they become somewhat cool, are placed in the heater, and another of a different pattern used; thereby a great saving of labor is effected, and the manufacture of crockery-ware greatly expedited, with much less expense than by any other known method.

What we claim as our invention is—

The process of manufacturing crockery-ware from soft or plastic clay by the use of heated metallic molds, when heated at about the temperature of 212° Fahrenheit, as herein described, and for the purpose set forth.

In testimony whereof we have signed our names to this specification in the presence of two subscribing witnesses.

ELIAS LEAK.
      HENRY MOORE.
      JAMES TAYLOR.

Witnesses:
 THOMAS STEEL,
 PETER DEHE.